UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF PRODUCING SILICON.

No. 906,338.   Specification of Letters Patent.   Patented Dec. 8, 1908.

Application filed September 14, 1907. Serial No. 392,837.

*To all whom it may concern:*

Be it known that I, FRANK J. TONE, of Niagara Falls, Niagara county, New York, have invented a new and useful Process of Producing Silicon, of which the following is a full, clear, and exact description.

This invention refers to improvements in the manufacture of silicon from silicates of aluminum and has for its object the production therefrom of new and useful substances containing silicon or aluminum or both of these elements.

Aluminum silicate is an ore of aluminum of wide occurrence and is the basis of all true clays. I have discovered that by smelting this ore in the electric furnace together with carbon as a reducing agent, it is possible to obtain therefrom elemental silicon in metallic form and alumina in a fused crystalline form having great hardness and abrasive qualities and possessing high purity, making it useful in various arts in which alumina is employed.

I take kaolin which is the purest form of aluminum silicate preferably first calcining it to free it from the combined water, and mix therewith a suitable reducing agent such as carbon, using 222 parts of the ore to 48 parts of carbon, although I do not wish to limit myself to these exact proportions. When this charge is smelted in the electric furnace, a reaction occurs in accordance with the following equation:

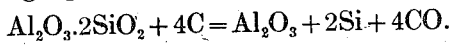
$$Al_2O_3.2SiO_2 + 4C = Al_2O_3 + 2Si + 4CO.$$

The aluminum silicate is dissociated and the silicon therein is reduced to its elemental form. There being insufficient carbon to also reduce the aluminum, this does not part with its oxygen and appears in the form of fused oxid of aluminum. The silicon gathers in masses through the fused alumina, the extent of the agglomeration depending upon the size of the furnace, the temperature and other conditions. The fused alumina is of considerably higher specific gravity than the silicon and tends to settle to the bottom of the furnace.

Any form of electric arc furnace of the vertical depending electrode type is suitable for carrying out this process. The charge mixture is fed into the crucible of the furnace around the arc where it fuses and is reduced as above described. The fused mass builds up as the electrodes are raised and as more charge is added from time to time until there is formed an ingot of considerable size. After a sufficient amount of ore has been smelted to form an ingot of a convenient size to handle, the fused material is allowed to cool and is broken up and the silicon separated from the alumina. This separation may be done in various ways. A rough separation may be made by hand after which I prefer to crush the finished product and separate the grains of alumina from silicon by concentration. When working on a large scale, it may be found desirable to tap out one or both products in molten form.

Silicon obtained by this process is useful for various purposes such as the refining of iron, steel and copper, and as a reducing agent in the reduction of refractory ores. The alumina is useful as an abrasive and also as an ore for the production of metallic aluminum.

I claim:—

1. The method of reducing silicon from ores containing aluminum and silicon, which consists in forming a mixture of the ore and carbon sufficient to reduce the silicon to its elementary form and insufficient to reduce the aluminum, said mixture being substantially free from iron-containing and basic metalliferous materials, subjecting this mixture to electrically developed heat sufficient to reduce the silicon and to fuse the alumina, and then separating the elemental silicon from the fused alumina.

2. The method of reducing aluminum silicate, which consists in forming a mixture of aluminum silicate and carbon sufficient to reduce the silicon to its elementary form, and insufficient to reduce the aluminum, said mixture being substantially free from iron-containing and basic metalliferous materials, subjecting this mixture to electrically developed heat sufficient to reduce the silicon and to fuse the alumina, and then separating the elemental silicon from the alumina.

In testimony whereof, I have hereunto set my hand.

FRANK J. TONE.

Witnesses:
CHARLES CHORMANN,
S. S. DIEMER.